United States Patent
Nahues et al.

(10) Patent No.: US 8,468,971 B2
(45) Date of Patent: Jun. 25, 2013

(54) SAFETY SWITCH DEVICE FOR ROTARY MILKING PARLOR

(75) Inventors: Michael Nahues, Warendorf (DE); Herbert Dreyer, Ahlerstedt (DE); Eric Stussy, Onalaska, WI (US)

(73) Assignee: GEA Farm Technologies GmbH, Bönen (DE)

( * ) Notice: Subject to any disclaimer, the term of this patent is extended or adjusted under 35 U.S.C. 154(b) by 473 days.

(21) Appl. No.: 12/584,062

(22) Filed: Aug. 28, 2009

(65) Prior Publication Data

US 2010/0126421 A1 May 27, 2010

Related U.S. Application Data

(60) Provisional application No. 61/190,569, filed on Aug. 29, 2008.

(51) Int. Cl.
*A01J 7/00* (2006.01)
(52) U.S. Cl.
USPC ..................................... 119/14.14; 119/14.04
(58) Field of Classification Search
USPC .......... 119/14.14, 14.04, 14.01, 14.03, 14.08, 119/14.18
See application file for complete search history.

(56) References Cited

U.S. PATENT DOCUMENTS

| | | | |
|---|---|---|---|
| 3,095,854 A | | 7/1963 | Bott et al. |
| 3,805,741 A | * | 4/1974 | Thompson et al. ........... 119/510 |
| 3,835,814 A | * | 9/1974 | Jacobs et al. ................ 119/14.04 |
| 3,921,586 A | * | 11/1975 | Sweeney et al. .............. 119/510 |
| 3,934,551 A | * | 1/1976 | Sulzberger .................. 119/14.04 |
| 4,005,680 A | * | 2/1977 | Lole ........................... 119/14.08 |
| 4,276,459 A | * | 6/1981 | Willett et al. ............... 200/43.17 |
| 4,918,266 A | * | 4/1990 | Dalebout et al. ............ 200/52 R |
| 5,113,043 A | * | 5/1992 | Morris ........................ 200/43.01 |
| 6,322,326 B1 | * | 11/2001 | Davis et al. ..................... 417/40 |
| 6,435,247 B1 | * | 8/2002 | Kerr ............................... 156/555 |
| 6,552,659 B1 | * | 4/2003 | Waltz et al. ................ 340/545.1 |
| 6,814,027 B2 | | 11/2004 | Hein et al. |
| 2009/0145364 A1 | * | 6/2009 | Hardy et al. ............... 119/14.04 |

FOREIGN PATENT DOCUMENTS

| | | |
|---|---|---|
| AU | 1388476 | 11/1977 |
| DE | 102008005024 | 7/2008 |
| EP | 1 163 842 A2 | 12/2001 |
| EP | 1 318 717 B1 | 3/2006 |
| GB | 1398596 | 6/1975 |
| WO | WO 2004/023866 A2 | 3/2004 |

OTHER PUBLICATIONS

PCT/EP2009/061112; International Search Report dated Aug. 24, 2010, 2 pages.

* cited by examiner

*Primary Examiner* — Yvonne Abbott
(74) *Attorney, Agent, or Firm* — Smith Law Office

(57) ABSTRACT

Safety switching device for a milking carousel, with a rotatably driven milking platform with a multiple number of milking stations, whereby preferably a milking machine is arranged at each milking station, and with at least one stationary, non-rotating animal passageway, as well as a gap arranged between the rotatable milking platform and the animal passageway, whereby the safety switching device has a movable switching paddle, as well as signaling device arranged or formed on the switching paddle, for triggering an alarm function, and whereby the switching paddle is designed and mounted in such a way that the distance to the outside peripheral edge (U) increases toward a free end.

17 Claims, 5 Drawing Sheets

SAFETY SWITCH DEVICE FOR ROTARY MILKING PARLOR

This application claims the benefit of U.S. Application No. 61/190,569 filed Aug. 29, 2008, the disclosure of which is incorporated by reference herein.

FIELD AND BACKGROUND OF THE INVENTION

The invention concerns a safety switch for a rotatably driven milking carousel.

A generic milking carousel is known for example from FIG. 5 of WO 2004/23866, as well as from patent applications parallel to this publication and going back to the same priority.

In rotary milking parlors, there is a central rotating platform with milking stalls where dairy animals are milked, and a stationary platform that partially surrounds the rotating platform. The stationary platform includes an animal passageway through which animals enter and egress the rotary platform while it is rotating. This portion of the stationary platform is also called an animal bridge. The stationary platform is situated close to the rotary platform so that the animals can step safely over a narrow gap and onto the rotary platform and back again after milking. Dairy workers must stand in a relatively wide area next to the rotary platform to prepare animals for milking. Between the wide worker area and the narrow gap between the animal bridge and the rotary platform is a transition region that narrows down. The transition region is a critical location because after a milking process, a milking machine is let down into a lowered position to hang outside the peripheral edge of the rotary milking platform The milking machine hangs from a rope or chain and the milking machine includes hoses that must pass into the gap without becoming stuck. Moreover, this region is naturally sensitive from the point of view of safety technology because milker operators, who spend time near the milking platform, must be careful that their bodies and extremities are not pulled inadvertently into the gap between the rotating milking platform and the animal passage.

To solve this problem area of safety technology, different safety devices have already been developed. Thus, it is known that a safety switch designed as an emergency cut-off switch can be arranged in the critical transition region with which the movement of the milking carousel can be stopped.

A known safety switching device has two safety switches that are positioned at suitable locations before the gap, and which react to contact, for example by a bulky milking machine that rotates with the milking platform. This contact shuts down the rotary platform.

In another known solution, the first of the two safety switches is arranged in a stationary manner in the direction of rotation at such a distance from the animal bridge that it can be triggered by an excessively bulky milking machine, which again initiates stoppage of the milking carousel to protect the machine. Nonetheless, due to the inertia, the milking carousel continues to rotate by a certain angle or path before it stops. Consequently, the distance between the switch and the gap should be large enough that the rotary milking platform always comes to a stop before the milking machine can be pulled into the gap between the animal bridge and the milking platform.

In spite of this, in practice, there is a problem because several milker operators work at the carousel. Specifically, it happens that the milker operator, who is at the milking carousel and nearest the stationary animal passageway and the animal access to the carousel, restarts the carousel after it had been stopped by the first safety switch without having eliminated the cause of the triggering of the first safety switch. This occurs regularly since the bulky milking machine will go past the first switch due to the inertia of the carousel and the milker operator cannot see the area of the first and second safety switch from his position. After the milker operator has restarted the carousel, the bulky milking machine will activate the second safety switch that is significantly closer to the stationary animal passage gap. The carousel stops again, but, due to the inertia of the carousel, the bulky milking machine comes into the gap between the outer periphery of the milking carousel and the stationary animal passageway, so that the milking machine is destroyed.

Moreover, it is disadvantageous that the existing two safety switches stop the carousel when corresponding sensors come into contact with water and excrement, which causes to false alarms.

This relatively expensive solution should be simplified constructively and with regard to its safety function. The solution to this problem is the task of the invention.

SUMMARY OF THE INVENTION

Accordingly, the safety switching device has a moveable switching paddle as well as a signaling mechanism for triggering an alarm. The signaling mechanism is arranged on the switching paddle or formed on it, and the switching paddle is designed and mounted in such a way that it has a free end extending outward from the peripheral edge of the platform's rotational axis.

With this design, it is sufficient to arrange only a single safety switching device in the transition region to the gap between the animal passage and the milking platform. Renewed start-up is possible only when the existing problem—for example the catching of the milking machine—has actually been eliminated. Since only one safety switching device is needed, the construction is simple and the safety function is nevertheless optimized.

With the new safety switching device, in addition, very good protection of the personnel is realized.

Preferably, as signaling sensor is included for recognizing the position of a milking machine/cable or of a chain. The signaling sensor can be a reed contact arrangement. When a magnet moves past the sensor, an alarm is triggered and/or the milking carousel is stopped immediately. Alternative embodiments to the reed contact arrangements are especially inductive switches, Hall sensors, as well as stress-strain sensors.

According to its variations, the invention provides numerous additional advantages, which will be explained in connection with the description of the figures.

Thus, the new safety switch provides very good guidance for tubes/chains/cables, etc. before and during entry into the gap. As a result, much fewer disturbances of the milking process occur, much less or even no material damage arises, and no down-time occurs for the elimination of disturbances (for example, replacing defective teat rubbers/pulse tubes/milk tubes, etc.).

Also, the safety switch takes up less room and results a dairy worker being able to stand closer to the switch without triggering the switch. This arrangement results essentially in gaining an extra milking station at the entrance and exit region of the rotary platform for performing various activities, for example for pre-dipping for udder cleaning/disinfection, because the milker operator can reach the udder without any problem even though he is standing in front of the safety switch.

Also, during the operation of the milking carousel, good control of the exit area is possible with only one operator.

A better protection for the milking equipment both during milking as well as during the preparation of the milking equipment for cleaning is achieved. During cleaning, the milking machine is inserted into the milking machine mounting for cleaning, which is referred to as "CIP" for cleaning in place). During cleaning, the milking carousel stops, yet it rotates during the preparation and during the post-cleaning operations.

The switching paddle is preferably designed so that due to its own weight it always remains in its normal position or home position.

Due to the significantly fewer carousel stops, wear on the carousel drive is lower, and milk outflows are more fluid. The milking output of the milker operator therefore increases.

With the preferred embodiment, the safety switch can be mounted either on the right or on the left of the animal passageway.

The invention also creates a milking carousel with at least one animal passageway whereby at the at least one animal passageway at least one safety switching device is arranged. As a minimum, at least one of the safety switching devices is designed in a direction of rotation so that in this direction of rotation the safety is increased, but not yet in the opposite direction of rotation.

Preferably, the invention also creates a milking carousel that can rotate in both directions past the animal passageway with safety switching devices according to the invention arranged so that one is in the clockwise direction before the gap and the other is in the counterclockwise direction before the gap.

Two safety switching devices—one in each direction of rotation—at each animal passageway provides the advantage that the safety function provided is ensured before the gap in the direction of rotation (that is, forward) and also against the direction of rotation (that is, backwards). The backward direction is to be chosen, for example, in case an animal becomes stuck inadvertently.

The invention will be described in more detail with reference to the drawing.

DETAILED DESCRIPTION OF THE PREFERRED EMBODIMENTS

Figure 1:
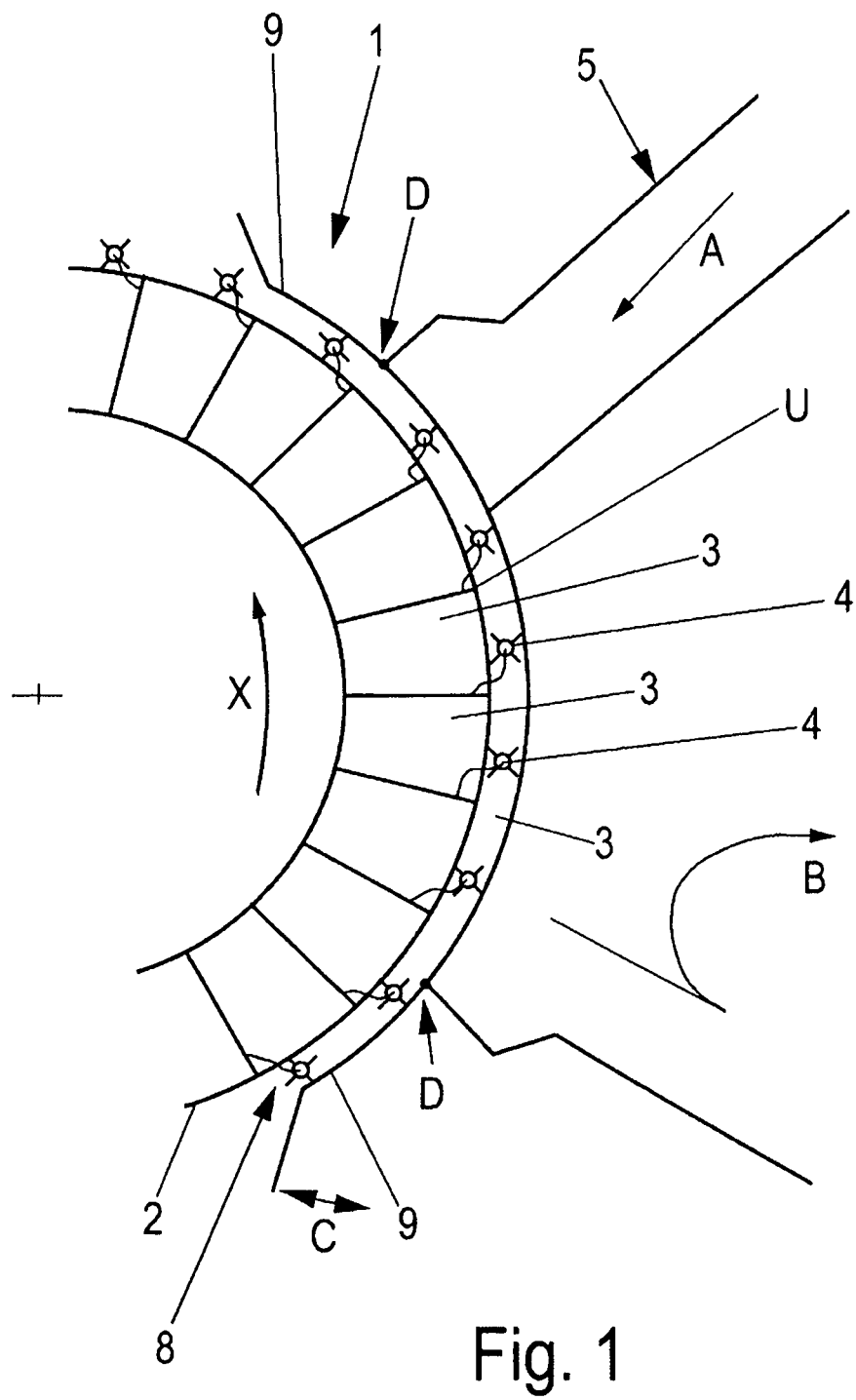
FIG. 1 is a top view of the area of an animal passageway on a schematically shown milking carousel with two safety switching devices according to the invention.

FIG. 1 shows a milking parlor designed as milking carousel 1 (or "rotary milking platform")—specifically as an outwardly accessible milking carousel—with a rotatably driven milking platform 2 laid out with a multiple milking stations 3. In such an outward milking carousel, the cows stand with their heads directed radially toward the inside.

A milking machine 4 is arranged at each milking station 3, and this is just shown schematically here.

Regarding the fundamental operation and design of the milking machine 4, reference is made, for example, to the already-mentioned WO 2004/23866. As can be seen from this publication, after milking, among other things, the milking machine 4 can be lowered into a lowered position outside the peripheral edge of the rotatable milking platform 2. In order that the animals to be milked can enter the milking platform 2, outside the outer peripheral edge of the milking platform 2, at least one animal passageway 5 is formed, designed as an animal bridge through which the animals enter the milking platform 2 (Arrow A) and, after turning around, can leave it again (Arrow B). Several animal passageways 5 can also be provided on the rotatably driven milking platform 2. Moreover, the regions in which the animals enter the milking platform can also be spaced apart from the regions in which they can leave the milking platform 2 (this latter variant is not shown).

The milking machine 4, which is only shown schematically here, includes at least one milk-collecting part, several milking cups and short milking tubes arranged between the milk-collecting part and the particular milking cups. The milking machines are suspended on at least one holding cable, rope or similar device on a holding device, for example, a service arm/vacuum cylinder above the milking platform 2 (whereby the latter components for hanging the milking machine are not shown here or are indicated together with the milking tubes by the reference number 6). The milking machine is connected to a milking line (not shown) through the milking tube 6. During cleaning, the milking machine is inserted into the milking machine mounting for CIP, cleaning in place. During cleaning the milking carousel can stop, but it rotates most of the time so that it is typically rotating during the animal cleaning preparation and post-cleaning operations.

The milking platform 2 according to FIG. 1 is preferably rotated in the direction of arrow X—here counterclockwise. When the milking machine 4 in its lowered position is lowered outside of the radially outer peripheral edge U of the milking platform 2, it must be moved—so to speak, "interwoven"—into a gap (region) 7 between the turning milking platform 2 and the animal passageway 5.

According to the invention, this process is both simplified and monitored by a safety switching device.

The safety switching device according to the invention has a switching paddle 9 arranged rotatably in the entry region 8 of gap 7, and a signaling device (elements 10, 13) arranged on the switching paddle 9 (see FIG. 2), whereby the switching paddle 9 may optionally itself form a part of the signaling device or of the signaling device.

The entry region 8 functions then as the entry region for disturbances for gap 7, when the milking carousel turns in the manner shown in FIG. 1, counterclockwise. It is important that it be considered the entry region for the incorrectly positioned milking machine, for milking tubes and/or cables or chains, which in their entirety are to be considered a disturbance for gap 7.

For example, the switching paddle 9 has the paddle-like geometry shown, that is, it is designed and mounted in such a way that its distance to the outer peripheral edge U of the milking platform decreases in the peripheral direction to gap 7 or to its rotary axis D so that a kind of "interweaving filter" is formed for the milking machine 4 into the gap 7 before the entry region 8, which supportively ensures that the milking machine will actually enter into the gap.

Figure 4:
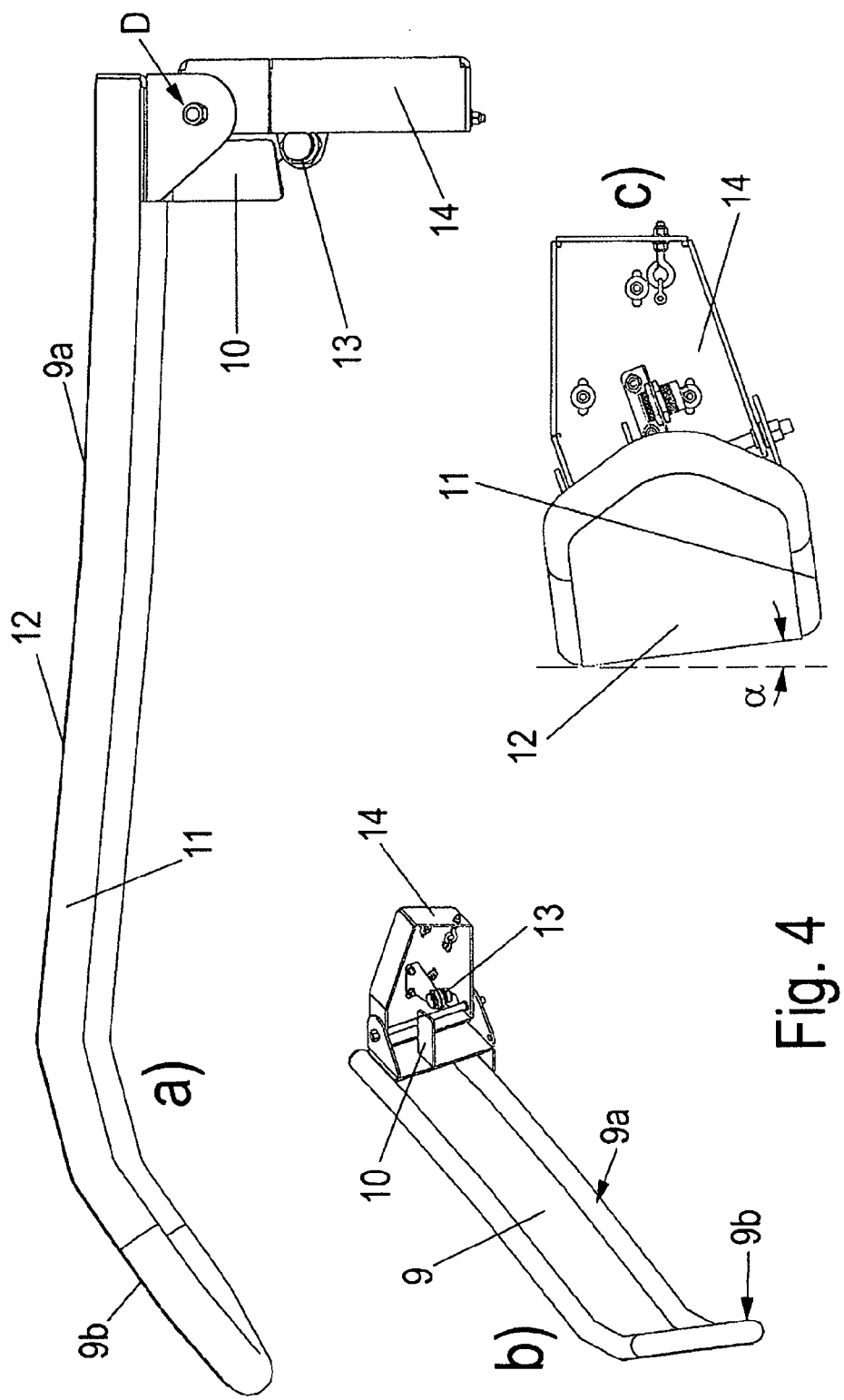
FIGS. 4a) to c) show various perspective views of a detailed representation of a safety switching device with a construction similar to those in FIGS. 1 to 3.
Figure 5:
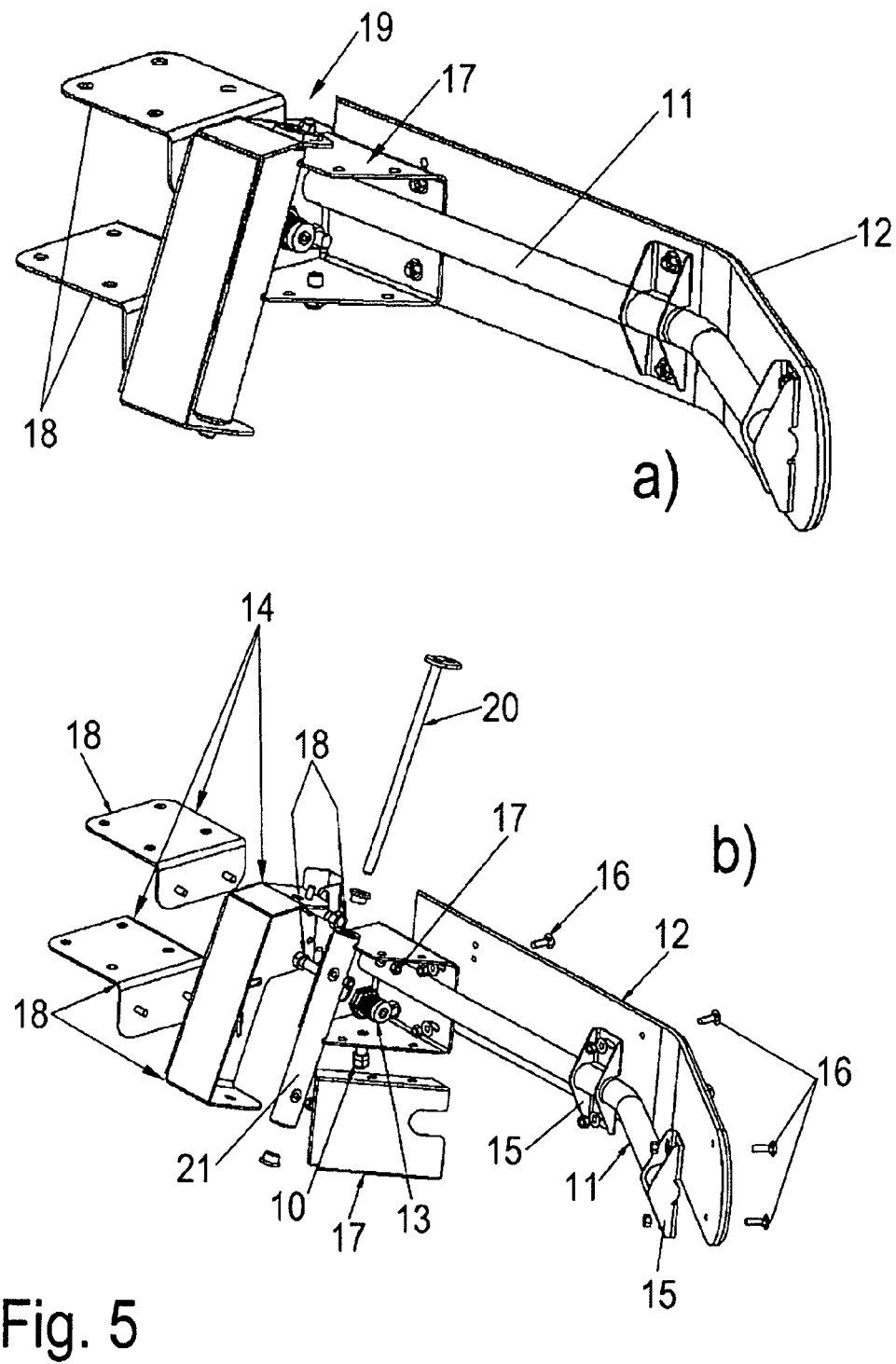
FIGS. 5a) and b) show a perspective view and an exploded view of another detailed representation of the safety switching device with a structure similar to that of FIGS. 1 to 3.

The switching paddle 9 can be bent from a piece of tubing 11 that is provided with a cover plate 12 (FIG. 4). Furthermore, it can be mounted on a rotary axis D on a mounting section 14 that is connected rotatably to region 9a of the switching paddle. The tubing can be located more easily on the outer periphery of the cover plate 12 (FIG. 4) but it can also be in other areas. For example, it may lie at a distance from the periphery of the cover plate 12 around the middle on the cover plate 12 (FIG. 5). The cover plate 9 can be made of sheet metal (FIG. 4) or plastic or of another material.

The tubing 11 and the cover plate 12 can be connected to one another with the aid of mountings 15. For example, it is possible to secure the mountings 15 with screws 16.

One or several elbows 17 on the cover plate 12 and one or several elbows 18 for securing on a block (on a stationary part of the milking carousel) are attached through a pivot bearing 19 with a bolt 20 and a tubing 21, so that the switching paddle 9 (or here the cover plate 12 with the tubing 11) can be swiveled around the pivot bearing 19, whereby the elbow 18 can be utilized as mounting section 14 for attachment to a block. The pivot bearing 19 can be directed vertically or at a slight angle to the vertical.

The switching paddle 9 of FIG. 5 is especially light and yet robust and can be produced in a cost-effective design. The elbows 17, 18 can be designed so that they come together to form a kind of housing, which protects the signaling device 10, 13.

In its region 9a, which lies closer to the rotary axis D, the switching paddle is positioned preferably essentially parallel to the tangential direction of the peripheral edge of the milking platform 5, whereby it can also have in sections a first region 9a that is even concentric or almost concentric with the outer periphery of the milking platform 5 and a—preferably arc-shaped—region 9b, which connects to region 9a at its end away from the rotary axis, in the course of moving in region 9b, the distance between the outer peripheral edge U of the milking platform 2 and the paddle 9 becomes larger, which facilitates the interweaving or guiding of the milking machine into gap 7. The safety switch is preferably located so that due to its own weight it always remains in its own position or oscillates in it.

Since furthermore the switching paddle 9 is arranged swivelably around a preferably vertical or approximately vertical rotary axis D, in the non-rotating region of the milking carousel in front of the animal bridge or the animal passageway 5 before gap 7 viewed in the direction of rotation, the signaling device can be arranged or formed on it or it itself may form the signaling device or a part of the signaling device that triggers an alarm function, which, for example stops the milking carousel when the switching paddle 9 is swiveled up through a predetermined angular region or when the force acting on the switching paddle 9 exceeds a limiting torque.

Figure 2:
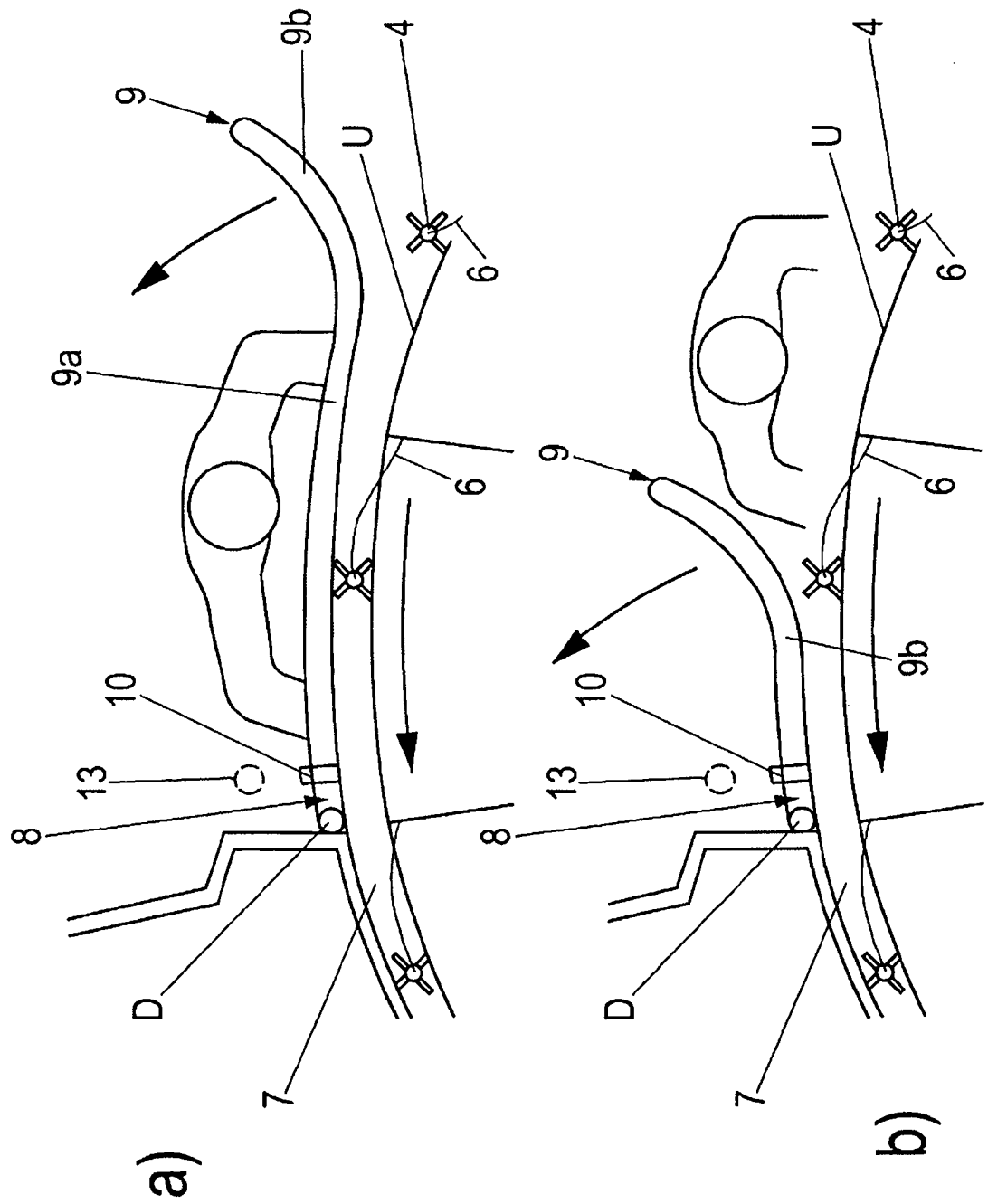
FIG. 2a shows a detailed representation of a partial region of the device from FIG. 1 on an enlarged scale, with a milker.
FIG. 2b shows a detailed representation of a partial region of another modified device of the type shown in FIG. 1 on an enlarged scale, with a milker.
Figure 3:
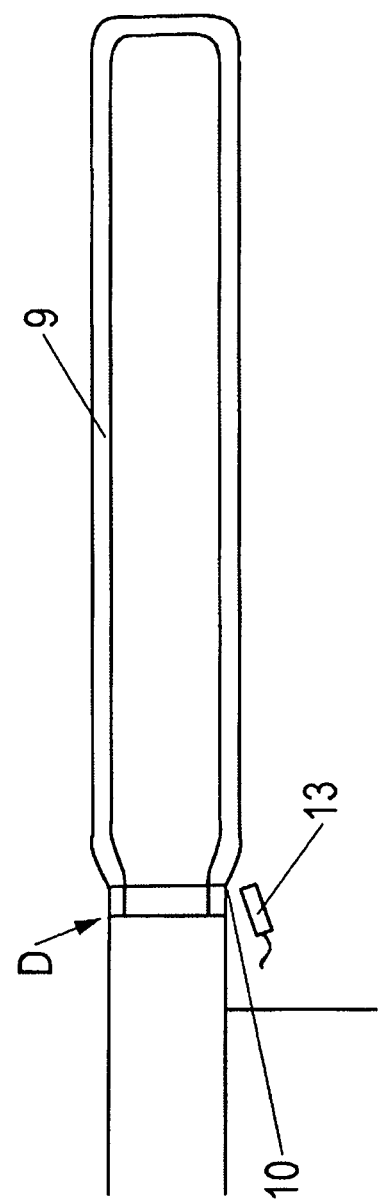
FIG. 3 shows a side view of a schematically represented safety switching installation.

This can be realized in a simple way, for example by the fact that the signaling device 10, 13 for the signaling of a predetermined position of the switching paddle 9 is designed in such a way that when an obstruction is entering the gap, the signal device generates a signal when the switching paddle 9 turns outward from the initial position of FIG. 2 from a position near to the milking platform 5 away from this toward the outside, whereby the signal generated by the signaling device triggers an alarm or safety function.

The signaling device 10, 13 can, for example, have an activating means arranged on the rotatable or pivotable switching paddle, for example, a magnet 10, and a switching means, for example, a reed contact 13 that can be switched by the magnet 10, and that reed contact is arranged in a stationary manner at a predetermined location in the animal passageway 5 or ideally even directly on a stationary part of the switching paddle, thus arranged on the attachment section 14 for attaching on a part of the animal passageway 5 or on another stationary part of the milking carousel.

The principle of an inductive switch 10, 13 is realized according to FIG. 4.

When the switching paddle with magnet 10, for example, moves past a sensor or a reed contact, this, or more generally the activation of the signaling device 10, 13, triggers the alarm function, such as, for example, the stopping of the milking carousel.

The rotary axis D of the switching paddle 9 is preferably oriented approximately vertically or at a slight angle (angle α) and can be pivoted out from this normal position upon triggering in case of a fault occurrence.

The switching paddle 9 should preferably remain in its normal position without any additional force (spring or compressed air cylinder or other).

However, it can also be held in its normal position by a force, for example a spring, for example when the rotary axis is completely vertical.

The switching paddle 9 can be manufactured from sheet metal, steel, wood or as a plastic body. FIG. 5 shows an embodiment with a switching paddle made of plastic.

Furthermore, the switching paddle 9 should be dimensioned in such a way that a milker outside the milking carousel can approach the gap 7 and perform work there. Moreover, as a result of the selected design, the milker operator cannot eliminate an alarm once it is initiated without pivoting the switching paddle back into its original position, which means that the problem that triggered the alarm is indeed eliminated (for example, by sorting out a bulky milking machine). Destruction of the milking machine is thus, in a simple manner, at least nearly always avoided.

It is especially advantageous when the switching paddle 9 is at least as long as the distance that the carousel travels due to inertia after being shut down, so that the milking machine stops before reaching the gap 7, whereby the switching paddle 9 is preferably at least 10 cm long, more preferably at least 50 cm and especially preferably at least 100 cm long.

FIG. 2a shows a switching paddle 9 that is longer in the peripheral direction and FIG. 2b shows a switching paddle 9 that is shorter in comparison to FIG. 2a, designed and dimensioned in such a way that the milker can assume his position in the peripheral direction next to the switching paddle, so that the switching paddle does not affect his work noticeably. Alternatively, the switching paddle 9 according to FIG. 2a is dimensioned in such a way that during milking the milker can assume his position radially, outside the switching paddle 9.

Furthermore, in the vertical direction it is at least 2 cm high, preferably at least 10 cm high.

The concept of the switching paddle 9 should not be interpreted too narrowly. It comprises plane contours, but specifically also arc-shaped contours when viewed from above in the mounted position. Preferably the switching paddle 9 or at least its cover plate 12 is designed to be movable, especially pivotable, and it comprises the signaling device 10, 13.

Through the selected design, it is sufficient to arrange only a single switching means or switching paddle 9 in each of the transition regions to the gap between the animal passageway 5 and the milking platform 2, whereby in any case it is conceivable to arrange a switching paddle on an animal passageway in both peripheral directions, that is, in the preferred direction of rotation U in the entry region to gap 7 and in the exit region from gap 7, so that even when the milking platform rotates opposite to the preferred direction of rotation, a safety function at the gap entry is realized. In this case, the two switching paddles 9 can be of the same length, but may also be of different lengths to be optimally suitable for their particular tasks. Thus, it is possible for the switching paddle 9 that protects during the backward movement to be made shorter than the switching paddle 9 that protects during the forward movement.

In order to adjust to different conditions, for example to different dimensions or geometries, the activations means and/or the switching means can be adjustable on the switching paddle. The switching means can also be designed on another stationary part on or near the animal passageway.

Preferably, the switching paddle 9 is designed so that it can be mounted in and against the direction of rotation "before" the animal passageway (for example, through a conically-pointed form).

Naturally, means other than those mentioned can be used as switching means. Thus, capacitive or inductive proximity switches, end switches, azimuth transmitters or optical signal transmitters (photoelectric barriers) can be used. Then, naturally, corresponding activation means are to be provided for the corresponding, selected switching means. In the case of a proximity switch, the activation means may consist of a simple material bolt, whereby the material is adjusted to the proximity switch.

Regarding FIG. 4, it should be pointed out that the rotary axis can also be formed by a rubber hinge and a bent sheet spring. Thus, one can connect the mounting section 14 to the switching paddle 9 very simply by using a piece of automobile tire in order to join the paddle 9 to the mounting section 14.

The invention claimed is:

1. A safety switching device for a rotatably driven milking platform with a plurality of milking stations, the safety switching device comprising:
   a switching paddle mounted on a pivot axis for pivoting movement between a first position and a second position, and the switching paddle has a free end spaced at a distance from the milking platform that is greater than a distance between the pivot axis and the milking platform; and
   an alarm signaling device joined to the switching paddle that activates when the switching paddle is moved to the second position.

2. The safety switching device of claim 1, wherein the pivot axis is a substantially vertical axis.

3. The safety switching device of claim 1, wherein the switching paddle is inclined when in the first position.

4. The safety switching device of claim 1, wherein the switching paddle has a free end that extends outwardly relative to the pivot axis.

5. The safety switching device of claim 1, wherein the switching paddle is disposed substantially tangential to the milking platform.

6. The safety switching device of claim 1, wherein the alarm signaling device comprises a an activator mounted on the switching paddle and a switch that is arranged in a stationary manner relative to the switching paddle.

7. The safety switching device claim 1, wherein the switching paddle comprises a pivotably attached animal passageway attachment section.

8. The safety switching device of claim 1, the signaling device comprises a reed switch, and the reed switch comprises a magnet.

9. The safety switching device of claim 1, wherein the signaling device comprises a proximity switch.

10. The safety switching device of claim 1, wherein the signaling device comprises an end switch.

11. The safety switching device of claim 1, wherein the signaling device comprises an optical switch.

12. The safety switching device of claim 1, wherein the signaling device comprises an azimuth transmitter.

13. The safety switching device of claim 1, wherein the signaling device comprises a switch selected from the group consisting essentially of: an inductive switch, a Hall sensor, and a stress-strain sensor.

14. The safety switching device of claim 1, wherein the switching paddle is made of a plastic.

15. The safety switching device of claim 1, wherein the switching paddle is made, at least in part, of sheet metal.

16. A safety switching device for a rotatably driven milking platform with a plurality of milking stations, the safety switching device comprising:
   a switching paddle mounted on a pivot axis for pivoting movement between a first position and a second position, wherein the second position is at a distance from the rotary platform that is greater than a distance between the first position and the milking platform; and
   an alarm signaling device joined to the switching paddle that activates when the switching paddle is moved to the second position.

17. A safety switching device for a rotatably driven milking platform with a plurality of milking stations, the safety switching device comprising:
   a switching paddle mounted on a pivot axis for pivoting movement between a first position and a second position and the switching paddle has a length that is equal to or greater than a stopping distance for the milking platform; and
   an alarm signaling device joined to the switching paddle that activates when the switching paddle is moved to the second position.

* * * * *

UNITED STATES PATENT AND TRADEMARK OFFICE
CERTIFICATE OF CORRECTION

PATENT NO. : 8,468,971 B2  
APPLICATION NO. : 12/584062  
DATED : June 25, 2013  
INVENTOR(S) : Michael Nahues, Herbert Dreyer and Eric Stussy It is certified that error appears in the above-identified patent and that said Letters Patent is hereby corrected as shown below:

In the Claims:

Claim 6, column 8, line 5 should read: "...comprises an activator..."

Claim 7, column 8, line 8 should read: "...device of claim 1, wherein..."

Signed and Sealed this  
Eighth Day of October, 2013

Teresa Stanek Rea  
*Deputy Director of the United States Patent and Trademark Office*